(12) United States Patent
Collodi

(10) Patent No.: US 6,624,812 B1
(45) Date of Patent: Sep. 23, 2003

(54) METHOD AND APPARATUS FOR PROVIDING SHADING IN A GRAPHIC DISPLAY SYSTEM

(76) Inventor: David J. Collodi, 3412 Kennedy Rd., Taylorville, IL (US) 62568

( * ) Notice: Subject to any disclaimer, the term of this patent is extended or adjusted under 35 U.S.C. 154(b) by 0 days.

(21) Appl. No.: 09/506,303

(22) Filed: Feb. 17, 2000

Related U.S. Application Data

(63) Continuation of application No. 09/222,036, filed on Dec. 29, 1998, now Pat. No. 6,226,006, which is a continuation of application No. 08/883,786, filed on Jun. 27, 1997, now abandoned.

(51) Int. Cl.[7] .............................................. G06T 15/60

(52) U.S. Cl. ...................................................... 345/426

(58) Field of Search ................................ 345/426, 582, 345/584, 586

(56) References Cited

U.S. PATENT DOCUMENTS

| | | | |
|---|---|---|---|
| 5,253,339 A | 10/1993 | Wells et al. | |
| 5,561,746 A | 10/1996 | Murata et al. | |
| 5,638,499 A | 6/1997 | O'Connor et al. | |
| 5,659,671 A | 8/1997 | Tannenbaum et al. | |
| 5,673,374 A | 9/1997 | Sakaibara et al. | |
| 5,808,619 A | 9/1998 | Choi et al. | |
| 5,835,220 A | 11/1998 | Kazama et al. | |
| 5,936,613 A | 8/1999 | Jaeger et al. | |
| 5,949,424 A * | 9/1999 | Cabral et al. | 345/426 |
| 6,175,367 B1 | 1/2001 | Parikh et al. | |
| 6,226,006 B1 | 5/2001 | Collodi | |
| 6,234,901 B1 | 5/2001 | Nagoshi et al. | |
| 6,251,011 B1 | 6/2001 | Yamazaki | |
| 6,290,604 B2 | 9/2001 | Miyamoto et al. | |
| 6,342,885 B1 | 1/2002 | Knittel et al. | |

OTHER PUBLICATIONS

PCT Search Report; Form PCT/1SA/220, Mailed Jul. 02, 1999, pp. 1–4.
Printout of Evans & Sutherland E&S Harmony Image Generator home page at website http://www.es.com/image-generators/harmony.html, Apr. 6, 1999, 6 pages.
OTMPHONG.DOC, Mortensen, Zach; Mar. 30, 1995, reprinted from Internet.
Fast Phong Shading, Bishop and Weimer, 1986, pp. 103–105, reprinted from Internet.
Moller et al.; Real Time Rendering, A. K. Peters, Ltd., 1999.
Foley et al.; "Computer Graphics: Principles and Practice" pp. 736–744, 866–869, 1996.
PCT Search Report; Form PCT/1SA/220, mailed Jul. 28, 1999, pp. 1–4.

(List continued on next page.)

*Primary Examiner*—Matthew Luu
(74) *Attorney, Agent, or Firm*—Brinks Hofer Gilson & Lione

(57) ABSTRACT

A method and apparatus for shading polygons in a graphics rendering system is provided. The method includes the step of providing, for each polygon to be shaded, a polygon coordinate system defined by three normalized vectors which represent the X, Y and Z axes. A light source defining a three dimensional light direction vector is further provided. The three dimensional light vector is rotated to correspond with the polygon direction vector. The rotated three dimensional light vector is converted into a two dimensional vector whose length is proportional to the angle between the polygon Z vector and the light direction vector. Another aspect of the present invention involves the interpolation of two dimensional vertex angle values, provided for each of the polygon's vertices, at each drawn pixel within the polygon surface. A bump map vector value is added to the interpolated vertex value forming a two dimensional composite surface angle vector. Light coefficients are then derived from the distance between the composite surface angle vector and the two dimensional light vectors.

36 Claims, 4 Drawing Sheets

OTHER PUBLICATIONS

Printout of Evans & Sutherland E&S Harmony Image home page at website http:/www.es.com/image–generators/harmony.html, Apr. 6, 1999, 6 pages.

Dana et al., "Reflectance and Textures of Real–World Surfaces," *AMC Transactions on Graphics*, vol. 18, No. 1, Jan. 1999, pp. 1–34.

Ward, "Measuring and Modeling Anisotropic Reflection." *Computer Graphics*, 26 Jul. 2, 1992.

Becker et al., "Smooth Transitions between Bump Rendering Algorithms," undated.

Joe Stam, "Diffraction Shaders," Alias/wavefront, SIGGRAPH 1999.

Westin et al., "Predicting Reflectance Functions from Complex Surfaces," *Computer Grahics*, 26, Jul. 2, 1992.

* cited by examiner

METHOD AND APPARATUS FOR PROVIDING SHADING IN A GRAPHIC DISPLAY SYSTEM

RELATED APPLICATION

This application is a continuation of application Ser. No. 09/222,036, filed Dec. 29, 1998, now U.S. Pat. No. 6,226,006, which is a continuation of Ser. No. 08/883,786 filed Jun. 27, 1997, now abandoned.

BACKGROUND OF THE INVENTION

1. Field of the Invention

The present invention relates generally to the creation of computer generated images for viewing on a screen. In particular, the present invention relates to the shading of computer generated images.

2. Art Background

The rendering and display of non-uniform surfaces such as curves and rough surfaces has long been a problem in three-dimensional computer graphics systems. The difficulty in performing these tasks is a result of the polygonal nature of these systems. For reasons of speed and diversity, most three-dimensional objects to be displayed in computer systems are represented by a collection of flat polygons. A polygonal system such as this has the advantage of being able to translate and project such objects quickly and efficiently. A chief drawback of polygon modeling, however, is the difficulty in representing complex surfaces as a collection of flat polygons. A smooth curve, for example, would require an infinite number of flat polygons to be accurately represented. Even the subdivision of the curve into a finite polygon mesh might still lead to unacceptable visual inaccuracies depending on the distance and angle it is being viewed from. Many different strategies have been proposed for the rendering of such surfaces within the confines of polygonal data representation.

Techniques known as Gouraud shading and Phong shading are previous approaches to the rendering of curved surfaces specified by flat polygons. Both of these techniques work in a similar fashion wherein the polygonal data is not altered, but the illusion of curvature across the drawn surface of a particular polygon is achieved by the individual illumination of every pixel within its visible surface. Gouraud shading, or color interpolation, is the fastest of these techniques and, consequently, the most widely used in real-time applications. In Gouraud shading, the particular curve of a polygon is specified by a collection of normalized three-dimensional vectors representing the surface angle of the polygon at each of its vertices. Light intensity values are calculated at each vertex by taking the dot product of the vertex angle vector and the various light source vectors. The intensity values at each vertex are then linearly interpolated across the drawn surface of the polygon. This variance of light intensity gives the rough impression of a curved surface.

However, Gouraud shading has several drawbacks. The highlights produced by a Gouraud shading model are linear (angular), which can produce visual inaccuracies in polygons representing too great a curvature. Another shortcoming of Gouraud shading is its inability to reliably display specular highlights. Since the highlights produced by specular reflected light are generally smaller than diffuse highlights, those specular highlights which occur at or near the center of a polygon could be missed entirely by Gouraud shading. According to one improvement of the Gouraud shading technique, the polygon is tessellated in accordance with its curvature and its relation to given light sources. This process, however, is still subject to the same limitations generally imposed by Gouraud shading.

Another shading technique is known as Phong shading. This technique works by interpolating the vertex angle vectors across the drawn surface of the polygon and then carrying out lighting equations for every pixel therein. The highlights produced by this technique are quadratic (round) and, because lighting calculations are done per pixel, all specular highlights are accurately displayed. The chief drawback of a Phong shading model is the severe performance penalty imposed by the amount of per pixel calculation required. Accordingly, the computational burden associated with this process is significant.

Some attempts have been made to reduce the computational cost of pure Phong shading by selectively shading polygons: using more complex shading routines only on polygons which require them. This process is illustrated in U.S. Pat. No. 5,253,339. While the use of such a technique reduces the overall time required for scene generation, polygons representing significant curvature must still be shaded with complex, time-consuming lighting routines.

Therefore, as described above, there is a need for a method and apparatus capable of producing a high quality three-dimensional image using a computationally more efficient process.

SUMMARY OF THE INVENTION

The present invention provides a computationally more efficient process and apparatus for producing a high quality three-dimensional image.

According to a preferred embodiment of the invention, a polygon within the scene to be shaded is provided. The polygon has a polygon coordinate system defined by three normalized vectors which represent the X, Y, and Z axes. A light source is represented by a three dimensional light source direction vector. The three-dimensional light source direction vector is rotated to correspond with the polygon coordinate system in order to provide a rotated three-dimensional light source direction vector. The rotated three-dimensional light source direction vector is converted into a two-dimensional vector whose length is proportional to the angle between the polygon Z vector and the three-dimensional light source direction vector.

According to another aspect of the preferred embodiment, the invention includes the step of providing a three-dimensional light specularity vector. The three-dimensional light specularity vector is rotated to correspond with the polygon coordinate system. The rotated three-dimensional light specularity vector is then converted into a two-dimensional vector whose length is proportional to the angle between the polygon Z vector and the three-dimensional light specularity vector.

According to a further aspect of the preferred practice, two-dimensional vertex angle vectors given at each of the polygon's vertices are interpolated at each pixel residing on the drawn surface of the polygon. The interpolated vertex angle vector may then be combined with a bump-map value to produce a (two-dimensional) composite surface angle vector quantity. This distance from this vector to the aforementioned two-dimensional light and specularity vectors is then used to determine lighting coefficients.

The present invention, together with attendant objects and advantages, will be best understood with reference to the detailed description below, read in conjunction with the accompanying drawings.

DETAILED DESCRIPTION OF THE PREFERRED EMBODIMENTS

The methods comprising the present invention operate within the context of a three-dimensional computer graphics system wherein the objects within any given scene are represented with a plurality of planar polygonal surfaces, each consisting of and defined by an arbitrary number of vertices (no less than three) specified in a unique order, and whose totality constitutes the scene database. The description presented henceforth details the methods and operations of the present invention in general and does not serve to limit its use to one particular embodiment as will be recognized by those of ordinary skill in the art. The methods of the present invention may be used within computer software as a sequence of machine instructions which operate on data provided within any suitable three-dimensional graphics program. The methods of the present invention may also, more preferably, be implemented within computer hardware for fast and efficient determination of pixel lighting coefficients.

As used herein, the term "angle-proportional" is intended to include a two-dimensional vector, converted from a three-dimensional vector, whose length is proportional to the angle formed between the original three-dimensional vector and the z-axis of its coordinate system.

As also used herein, all angle-proportional vector component values will be specified as integer values for purposes of simplicity.

As also used herein, the term "current polygon" refers to the particular polygon (within the collection of polygons constituting the scene database) which is being operated on by the process of the present invention.

As further used herein, the term "current pixel" is used to denote the pixel, residing on the drawn face of the current polygon which is presently being operated on by the processes disclosed below in with respect to the second aspect of the present invention.

The present invention consists of first aspect wherein a process performed within a polygon computer graphics system on a per-polygon basis. The various steps of the first aspect are executed for each polygon (to be displayed) either before, during or after the vertex coordinates of that polygon are translated to screen space coordinates, but before that polygon is drawn into display memory. The following will be considered to be present in computer memory prior to the execution of any of the steps constituting the first aspect: (1) the orientation of the current polygon's visible face, and (2) appropriate information pertaining to the light sources which may affect the illumination of the current polygon's visible face.

Figure 1:
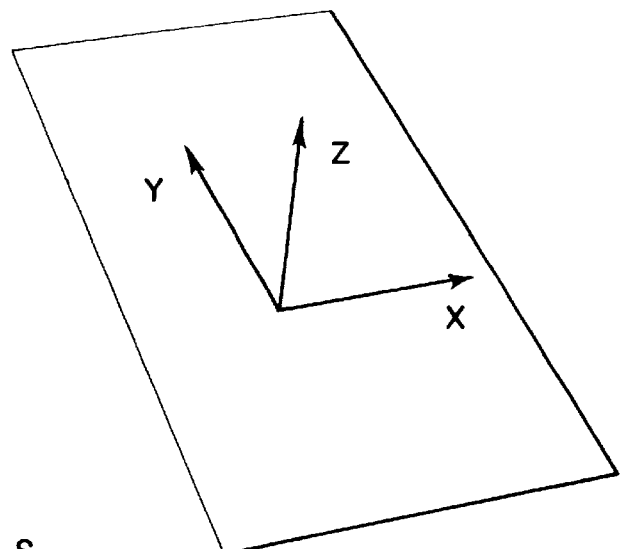
FIG. 1 is a diagram illustrating a polygon with its associated coordinate system.

The orientation of the polygon's visible face can be described as a collection of values which represent the x, y, and z orientation of the visible face of the polygon given in relation to an arbitrary coordinate system. Usually this "arbitrary" coordinate system refers to the world-view coordinate system (the default coordinate system in which the vertex coordinates of each of the polygons comprising the scene database are expressed). In some cases, however, the current polygon may be part of an object (a grouped collection of polygons whose orientation remain constant to one another) which may change its orientation relative to the world-view coordinate system. In this case, it would be more advantageous to represent the polygon face orientation relative to the orientation of the object rather than the world-view (this is because the polygon will remain constant relative to the object orientation). The simplest way to represent a polygon orientation is through an orthogonal set of three normalized three-dimensional vectors which represent the x, y, and z axis of the polygon orientation. These three vectors, which will henceforth be referred to as the polygon $\underline{X}$, $\underline{Y}$, and $\underline{Z}$ vectors (each comprised of x, y, and z values expressed relative to the aforementioned arbitrary coordinate system) which collectively specify the current polygon's coordinate system. An arbitrary polygon and its associated coordinate system are depicted in FIG. 1. As exemplified by FIG. 1, the polygon $\underline{Z}$ vector is perpendicular to the polygon face and, thusly, equivalent to the polygon surface normal. A representation of the polygon coordinate system can be conveniently stored as a 3×3 matrix of floating point values in the following format:

$$\begin{bmatrix} X_x & X_y & X_z \\ Y_x & Y_y & Y_z \\ Z_x & Z_y & Z_z \end{bmatrix} \quad (1)$$

Light source information must also be present in computer memory for each light source which may affect the current polygon. The standard description of an arbitrary parallel light source consists of, for example, a set of values describing the hue and intensity of the light source and a normalized vector representing its direction. It is important to note that only parallel light sources are used within this description. This is primarily for reasons of clarity and simplicity, and it should be noted that the methods of the present invention could readily be adapted for the calculation of point light source coefficients as well. It should also be noted that the detailed description presented herein exemplifies the calculation of the lighting coefficients produced by only one light source. This is done to clarify its logical operation. It will be readily understood that the invention is not limited to the use of a single light source. The methods of the present invention can be applied in sequence or in parallel to the calculation of multiple light sources.

It should also be noted that the polygon coordinate system need not coincide with the orientation of the polygons visible face. In the above example, the polygon $\underline{Z}$ vector coincided with the polygon normal vector. In most cases, this is desireable to maximize light calculation accuracy. It is not required, however. In some instances, it may be more desirable to provide a number of individual polygons with a common polygon coordinate system. In this case, same three dimensional polygon $\underline{X}$, $\underline{Y}$, and $\underline{Z}$ axis vectors will be used for each given polygon, even though the coordinate system may or may not coincide to the orientation of the visible face of any of the polygons. Henceforth, the polygon coordinate system should be considered as an arbitrary coordinate system which only corresponds to the visible face of the current polygon in this document for the purposes of simplicity and clarity of example.

Figure 2:
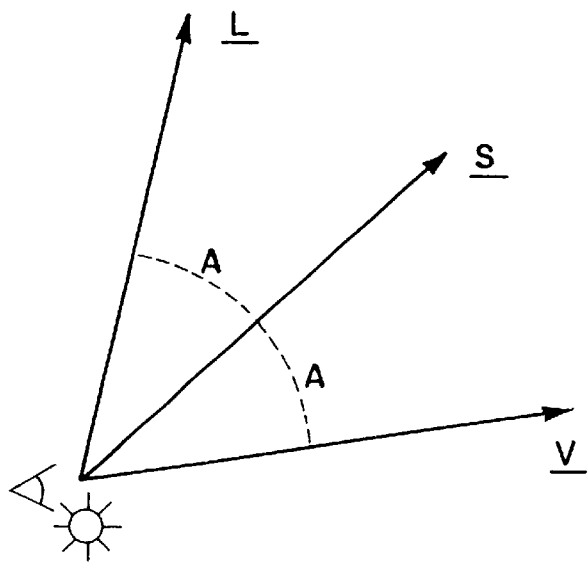
FIG. 2 is a diagram illustrating a specularity vector lying halfway between the view and light source vectors.

In addition to the light source direction vector, which will henceforth be referred to as vector $\underline{L}$, the presence in memory of a specularity vector, $\underline{S}$, is also required. As illustrated in FIG. 2, the specularity vector is the unit length vector that lies halfway between an outwardly directed light source vector and the view direction vector. The specularity vector $\underline{S}$, which is also referred to as the halfway vector $\underline{H}$, can be calculated by normalizing the vector sum of the view and light source vectors. A problem in the calculation of $\underline{S}$ arises when the view and light source vectors are opposite, that is whenever $\underline{V}=-\underline{L}$. When this occurs, the vector sum $\underline{V}+\underline{L}$ results in a zero vector, which cannot be normalized. This problem can be corrected, however, by altering the vector sum by a default amount before normalization. Although the use of a normalized specularity vector provides the most consistent determination of specularity coefficients, an alternate method will be disclosed later in this text.

Figure 3:
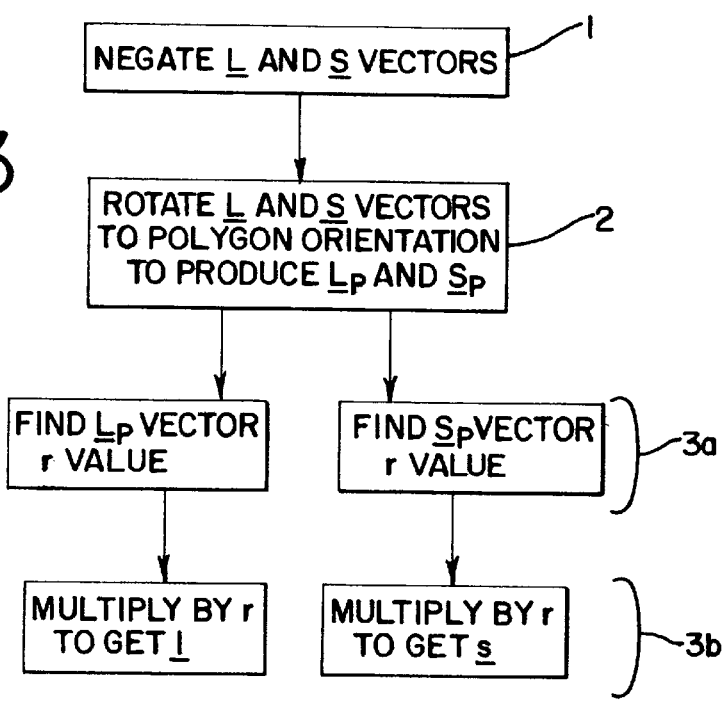
FIG. 3 is a flowchart illustrating a preferred embodiment implementing a first aspect of the present invention.

FIG. 3 is a flowchart outlining the preferred process of according to the fist aspect of the present invention. In step (1), the $\underline{L}$ and $\underline{S}$ vectors of the given light source are negated if their direction is outward. A light source vector $\underline{L}$, for example, is said to be outwardly directed if its direction points away from the light source. The negation of this vector ($-\underline{L}$) reverses its direction, causing it to point toward the light source. It is not necessary to test whether or not the $\underline{L}$ and $\underline{S}$ vectors are outwardly directed, as these vectors are assumed to be provided in a known format. In step (2), the inwardly directed $\underline{L}$ and $\underline{S}$ vectors, which are assumed to be given relative to the world-view coordinate system, are then rotated to the polygon coordinate system. If the current polygon orientation is expressed in world-view coordinates, this rotation is simply performed by the left-multiplication of the $\underline{L}$ and $\underline{S}$ vectors by the polygon orientation matrix in the following manner:

$$\begin{bmatrix} L_pX \\ L_pY \\ L_pZ \end{bmatrix} = \begin{bmatrix} X_x & X_y & X_z \\ Y_x & Y_y & Y_z \\ Z_x & Z_y & Z_z \end{bmatrix} \begin{bmatrix} LX \\ LY \\ LZ \end{bmatrix} \quad \begin{bmatrix} S_pX \\ S_pY \\ S_pZ \end{bmatrix} = \begin{bmatrix} X_x & X_y & X_z \\ Y_x & Y_y & Y_z \\ Z_x & Z_y & Z_z \end{bmatrix} \begin{bmatrix} SX \\ SY \\ SZ \end{bmatrix} \quad (2)$$

The resulting three dimensional vectors, $\underline{L}_p$ and $\underline{S}_p$, are equivalent to the $\underline{L}$ and $\underline{S}$ vectors expressed relative to the current polygon coordinate system. If the polygon orientation is specified in object relative coordinates, the $\underline{L}$ and $\underline{S}$ vectors must first be rotated to object-view coordinates, and then can be translated to $\underline{L}_p$ and $\underline{S}_p$ vectors by the above equations.

Step (3) involves converting the three-dimensional $\underline{L}_p$ and $\underline{S}_p$ vectors into two dimensional vectors $\underline{l}$ and $\underline{s}$ whose lengths are proportional to the angle difference between the polygon $\underline{Z}$ vector (polygon normal) and the original $\underline{L}$ and $\underline{S}$ vectors.

Figure 4:
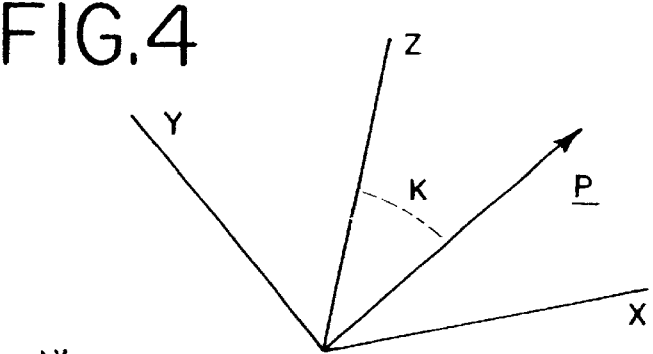
FIG. 4 is a diagram illustrating a three-dimensional vector.
Figure 5:
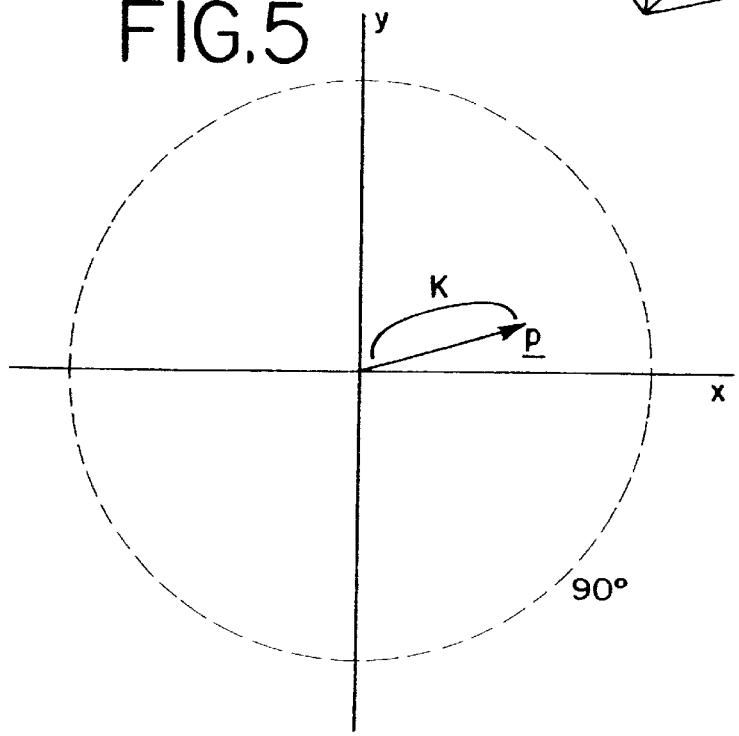
FIG. 5 is a diagram illustrating a two-dimensional representation of the vector shown in FIG. 4.

FIGS. 4 and 5 illustrate the conversion of an arbitrary three-dimensional vector $\underline{P}$, specified relative to an arbitrary coordinate system, into a two-dimensional vector $\underline{p}$. In particular, as shown in FIG. 4, the length of two dimensional vector $\underline{p}$ ($\underline{p}$) is proportional to the angle K between the original three-dimensional vector $\underline{P}$ and the z-axis of its coordinate system. The z-axis of the coordinate system can be defined by a unit vector originating at (x,y,z) coordinates (0,0,0) and terminating at coordinates (0,0,1). It is the angle between this vector and vector $\underline{P}$ which defines the aforementioned proportionality of $\underline{p}$. The above mentioned conversion of vector $\underline{P}$ into vector $\underline{p}$ can be effected in the preferred manner described below.

The z-coordinate (Pz) is dropped from vector $\underline{P}$, resulting in a two-dimensional vector (Px,Py). This two-dimensional vector is then scaled by the value r, producing:

$$(r \cdot P_x, r \cdot P_y) \quad (3)$$

The r value is a variable scaler quantity representing the ratio of the angle formed by $\underline{P}$ and the z-axis, to the xy planar distance from $\underline{P}$ to the z-axis. The value of r can be calculated from the Pz value by the following formula (assuming a right-hand coordinate system):

$$r = \frac{2\cos^{-1}(P_z)}{\pi\sqrt{1-P_z^2}} \quad (4)$$

A zero divisor occurs in the above formula, however, if the Pz value is equal to 1 or −1. In cases where the Pz value is equal to 1, the r value could simply be set equal to 1. In cases where the Pz value is −1, a default value of $\underline{p}$ could be used, provided its length is 2. In the case of converting a light vector, this practice is acceptable since a z value of −1 would indicate an angle distance of 180 degrees, and a light source at this angle would rarely affect the surface of the current polygon.

In step (3a), r values are found for the $\underline{L}_p$ and $\underline{S}_p$ vectors. The r values can be found by direct calculation using the above formula or an equivalent variation thereof. Due to the formula's inherent complexity, however, determination of r values through direct calculation may not always be desirable. Since the resulting $\underline{l}$ and $\underline{s}$ vectors need only be of discrete accuracy, the use of a lookup table in the determination of the r value is preferred. Such a lookup table, in a preferred form, could produce the most appropriate r value when indexed by a number of bits taken from a floating point representation, or a number of bits taken from a signed integer representation, of the vector z value. The r value produced by said lookup table could be given in either floating point or signed/unsigned integer notation.

In step (3b) the x and y values of the $\underline{L}_p$ and $\underline{S}_p$ vectors are then scaled by their respective r values, resulting in the angle-proportional $\underline{l}$ and $\underline{s}$ vectors. Once the $\underline{l}$ and $\underline{s}$ vectors are obtained, their coordinates can then be scaled to an arbitrary range and stored as signed binary integer values in excess or of two's complement notation. For the purposes of example, an integer range of −512 to 511 will be used for the integer representation of $\underline{l}$ and $\underline{s}$ component values since this range would provide sufficient accuracy for the following light coefficient determination.

While an integer range of −512 to 511 range should be sufficiently accurate for the storage of vector component values, some subsequent operations may require greater precision. If a greater precision is required, the integer component value may be right zero-extended to a fixed point representation.

It should be recognized that the angle-proportional s vector may be arrived at through methods other than the preferred method described above. For example, the view vector V could be negated if it is outwardly directed and then rotated relative to the polygon coordinate system to produce a resultant Vp vector. This Vp vector is then converted into a two-dimensional angle-proportional vector v by the methods disclosed above. The s vector can then be derived from the average of the v and l vectors whereby:

$$s = \tfrac{1}{2}(l+v) \quad (5)$$

The methods of a second aspect of the present invention operate within the scope of the scanline conversion of a polygon whereby the current polygon is converted to a plurality of scanline segments, each of which are drawn pixel-by-pixel to display memory. The sequence of operations comprising of the second aspect are performed for each drawn pixel within each scanline segment belonging to the current polygon. The steps constituting the first aspect of the present invention are assumed to have been performed for the current polygon prior to its scanline conversion and, thusly, prior to the execution of second aspect of the present invention. In particular, the l and s vectors arrived at by methods of the first aspect are assumed to be present in the preferred signed binary integer format.

With respect to this process of the second aspect, it should be understood that if the current polygon is to represent a curvature, then a plurality of surface angle vectors, representing the surface orientation of the current polygon at each of its vertices should be present in the computer memory prior to the execution of the second aspect. The surface angle vectors are angle-proportional vectors relative to the polygon coordinate system, as defined previously. Since it is not normally required that the surface curvature of a polygon be changed at run-time, the surface angle vectors belonging to any specific polygon can be considered a component of the information used to define that polygon and can be, thusly, calculated (using a microprocessor) for each polygon (requiring curvature) during the creation of the scene database and stored (in a memory) therein prior to scene generation.

By storing the vertex angle vectors in this manner, several advantages are provided. Since any vertex angle of a given polygon would conceivably never be greater than 90 degrees from the surface normal, the vertex angle vector component values would occupy only half the previously specified −512 to 511 range occupied by the l and s vectors. Thus, vertex angle vectors could be accurately represented within an integer range of −256 to 255. The storage of, in signed binary integer format, a two-dimensional vertex angle vector whose coordinates are within the above specified range would require, at most, 18 bits of storage space. The traditional method of storing vertex angle vectors, however, requires that they be stored in three-dimensional floating point format, which would consequently require (assuming a 4 byte floating point word size) a minimum of 96 storage bits.

Providing the surface of the current polygon is to be bump-mapped, the computer memory should include such information. In a preferred form for use within the methods of the present invention, an individual bump-map entry (cell) consists of an angle-proportional two-dimensional vector, b, which is expressed relative to polygon orientation and which is stored in a signed binary integer format. Since the accuracy of a bump-map cell is not required to be as precise as that for surface and light vectors and since, like vertex angle vectors, a bump-map angle vector is never required to be greater than 90 degrees from surface normal, the components of the b vector could be sufficiently represented within a truncated integer range of −127 to 127. Each bump-map cell would therefore require 2 bytes of storage to hold a two-dimensional b vector whose components are specified within the above mentioned range. A bump-map could also be represented in an alternate form whereby each cell contains a single value, h, representing the relative height of that region on the polygon surface. Providing then that the bump-map is aligned to the specified polygon orientation, the x component of the b vector could be arrived at by subtracting the h value of the next horizontally adjacent bump-map cell from the h value of the current cell. The y component of the b vector could likewise be calculated by subtracting the h value of the next vertically adjacent bump-map cell from that of the current bump-map cell. A bump-map in this representation would require less storage space than a bump-map in the previously specified preferred format, but would consequently produce less accurate and less consistent b vector component values.

Figure 6:
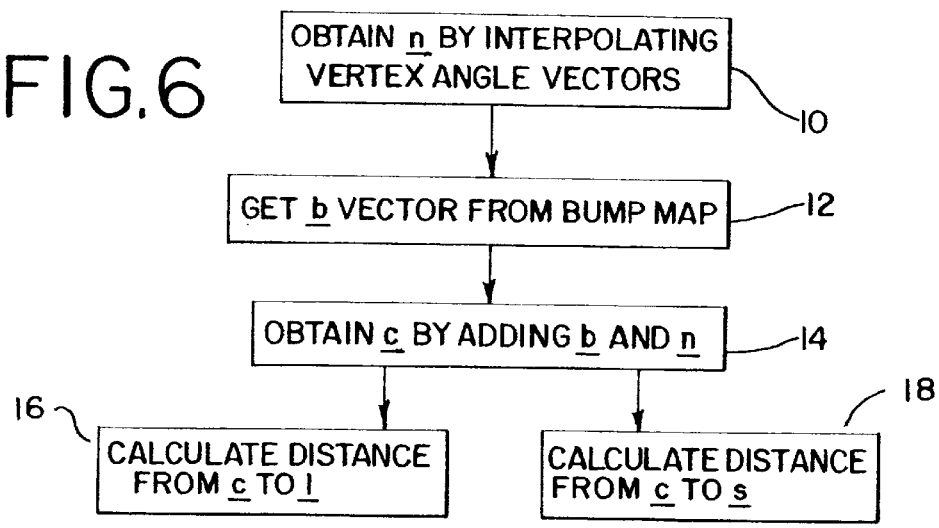
FIG. 6 is a flowchart illustrating a preferred embodiment implementing a second aspect of the present invention.

FIG. 6 is flowchart illustrating a preferred embodiment of the second aspect of the present invention. In step 10, a two-dimensional surface angle vector n is arrived at by the interpolation of the previously mentioned vertex angle vectors across the drawn surface of the polygon. A standard linear vertex interpolation technique, such as that used by the Gouraud shading routine, would be suitable for this purpose. In accordance with such a technique, the vertex angle vector x and y components are linearly interpolated at the edges of a scanline, and then linearly interpolated pixel-by-pixel across that scanline. In this manner, the vertex angle vectors for each vertex are interpolated for every pixel residing on the drawn surface of the polygon and, therefore, the surface angle vector n at any pixel on the surface of the current polygon represents a weighted linear combination of the vertex angle vectors at each of the current polygon's vertices. Since the vertex angle vectors are angle-proportional two-dimensional vectors which are used to represent three-dimensional vector quantities, their interpolation simulates the interpolation of the three-dimensional vertex angle vectors that they represent. It should be noted that whereas the interpolation of three-dimensional vertex vectors, as in the aforementioned Phong shading process, requires the normalization of the resultant vector, the length of vector n, representing the interpolation of angle-proportional vectors, need not be altered. This is so because the n vector, being composed of angle-proportional vectors, can be said to be angle-proportional itself whereby its length is representative of an angle and, thusly, need not be altered. The interpolation of vertex angle vectors in this manner, therefore, eliminates the need for resultant vector normalization and the subsequent computational costs inherent therein.

In step 12, the bump-map angle vector b is extracted from the particular bump-map cell which corresponds to the current pixel. The process of isolating a particular cell (obtaining the row and column coordinates of that cell) of a bump-map affixed to the surface of an arbitrary polygon given the screen coordinates of an arbitrary pixel residing on said polygon is equivalent to a standard perspective texture mapping routine of which many prior art techniques are well known. The presence of a commonly known routine is assumed which will obtain the correct row and column coordinates of the bump-map cell corresponding to the current pixel. In situations wherein texture mapping of a polygon surface is required in addition to bump-mapping, it would be advantageous to align the bump-map to the texture map in such a manner as that the row/column coordinates of a specific texel (texture map cell) can be readily converted (by the addition of a constant value and/or scaling by a power of 2) to the row/column coordinates of a corresponding bump-map cell.

It should be noted that if the bump-map is too small or the current polygon is being viewed from too near a distance, a single bump-map cell could represent a plurality of drawn pixels. The bump-map vector $\underline{b}$ of the cell representing the current pixel could be linearly interpolated with the $\underline{b}$ vectors of the nearest three adjacent bump-map cells to provide a gradual transition of bump-map values between the pixels of adjacent cells.

Figure 7:
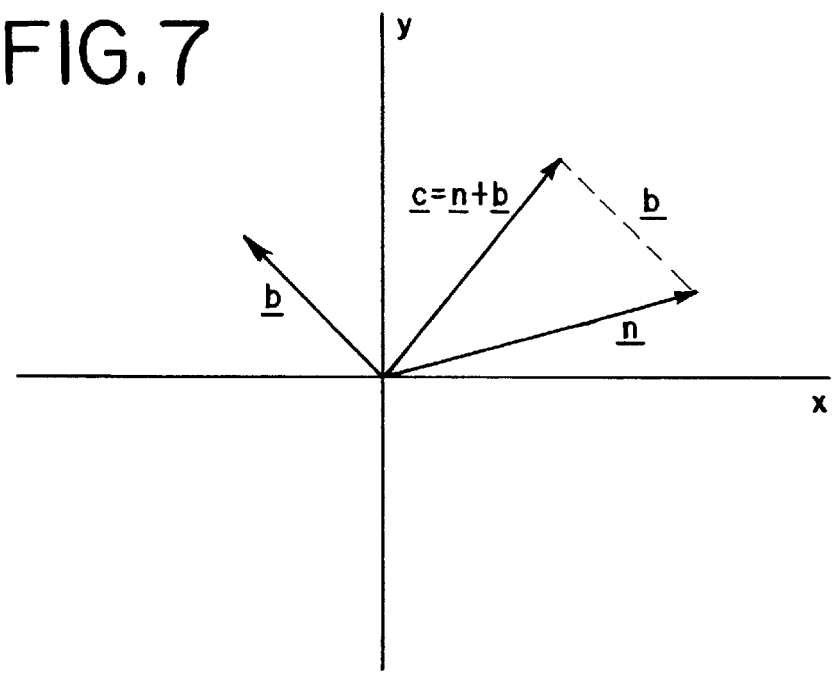
FIG. 7 is a diagram illustrating the representation of a composite surface angle vector as a sum of the surface angle vector and a bump-map vector.

In step 14, the bump-map angle vector $\underline{b}$ (obtained in the previous step) is combined with the surface angle vector $\underline{n}$ obtained in step (1), to form a composite surface angle vector $\underline{c}$. This $\underline{c}$ vector represents the total angular orientation of the current pixel, which is to say it is an angle-proportional two-dimensional vector representing the face orientation (as influenced by polygon curvature and bump-mapping) at the point on the surface of the current polygon which is referenced by the current pixel. As exemplified by FIG. 7, the $\underline{c}$ vector is obtained by the vector sum of the $\underline{b}$ and $\underline{n}$ vectors. If the $\underline{b}$ vector component values are given in the aforementioned −127 to 127 truncated integer range, the $\underline{b}$ vector must first be doubled before being added to the $\underline{n}$ vector. This is easily accomplished by a left bit-shift of the $\underline{b}$ vector x and y components.

Figure 8:
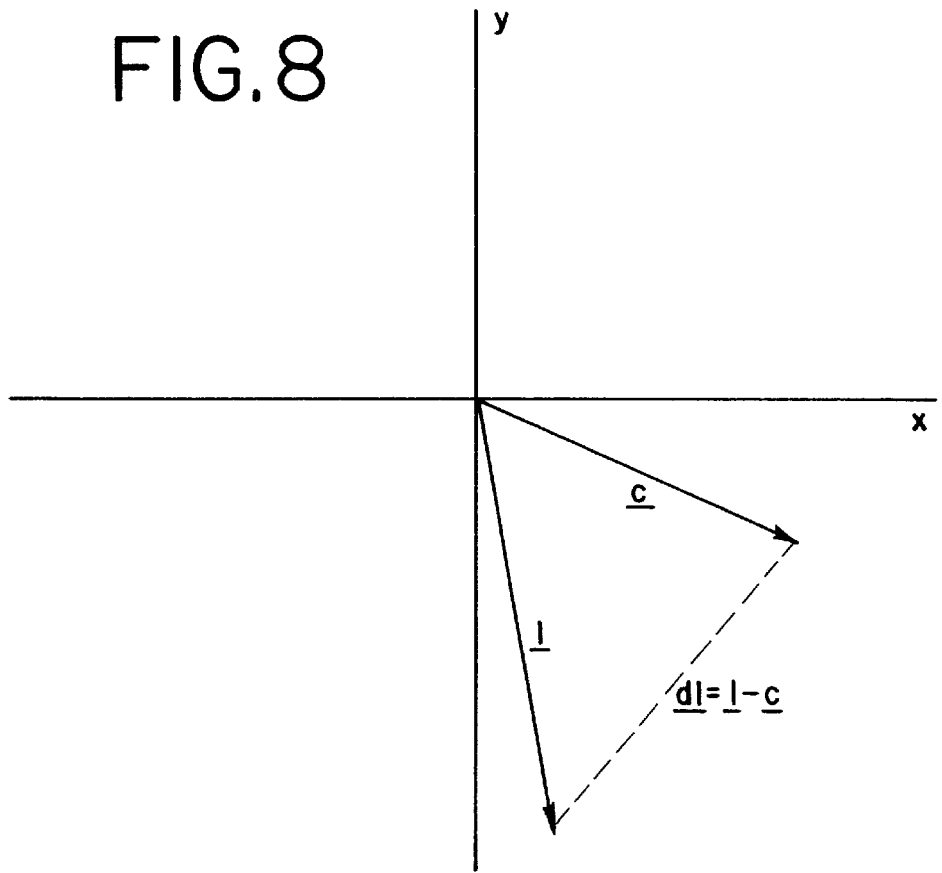
FIG. 8 is a diagram illustrating the calculation of a lighting coefficient from the distance between the two-dimensional vectors.

In step 16, the diffuse lighting coefficient is arrived at by first taking the linear distance from the light source vector $\underline{l}$ to the composite surface angle vector $\underline{c}$, as shown in FIG. 8. The linear distance is calculated by first finding the difference vector, $\underline{d1}$, between $\underline{l}$ and $\underline{c}$ where $\underline{d1}=\underline{l}-\underline{c}$. The length of vector $\underline{d1}$, which is the distance between the $\underline{l}$ and $\underline{s}$ vectors, is now found by taking the inner product of vector $\underline{d1}$ with itself and then taking the square root of the result $$\|\underline{d1}\|=\sqrt{\underline{d1}\cdot\underline{d1}} \tag{6}$$

The square root operation in the above equation is prohibitive, however, Because of this, the use of the square of the distance between the $\underline{l}$ and $\underline{c}$ vectors. ($d1^2$) in the determination of the diffuse light coefficient is preferred and will be used within the examples and descriptions below. It should be noted that since the relationship between the $\underline{l}$ and $\underline{c}$ vectors need only be quadratic, either of the two above mentioned formulas could adequately be used to provide the diffuse light coefficient.

The use of lookup tables can also be employed to further enhance the above mentioned distance calculation. A preferred form of such a lookup table (for determination of distance squared), indexed by a number of bits from a single integer value, produces the square of the index value in integer form. The $\underline{d1}$ x and y component values are then applied, in sequence or in parallel, to the above mentioned lookup table whereby the subsequent addition of the results produces $d1^2$. A two-dimensional lookup table, indexed by the $\underline{d1}$ x and y component values and producing a function of d1, may alternately be employed for the purpose of distance calculation.

If the distance d1 is greater than 255 (representing an angle difference of over 90 degrees in the above mentioned coordinate range), the light source does not affect the surface of the current polygon at the current point. In cases where at least one of the components of $\underline{d1}$ is greater than 255, $d1^2$ need not be calculated since d1 must necessarily be greater than 255. A default value of $255^2$ could then be assigned to $d1^2$ since this is the maximum distance it will need to represent.

The value of $d1^2$ now resides in the range of 0 to $2(255^2)$. This value is next clamped to the necessary range of 0 to $255^2$. This is simply accomplished by OR'ing the highest order bit (that $d1^2$ will occupy) with all lower order bits and then dropping said high order bit. In step (4a) the diffuse light coefficient value, Cd, is then set equal to an arbitrary number of the highest order bits of $d1^2$. For sufficient accuracy, the 8 highest order bits may be used, providing Cd with an unsigned integer range of 0 to 255.

In step 18, the specular light coefficient is arrived at by first taking the linear distance from the composite surface angle vector $\underline{c}$ to the specularity vector $\underline{s}$. In a like manner to the calculation of $\underline{d1}$ vector, a difference vector ($\underline{d2}$) is found by vector subtraction of the $\underline{s}$ and $\underline{c}$ vectors where $\underline{d2}=\underline{s}-\underline{c}$. Since specular highlights are only, by properties of reflection, half the size of diffuse highlights, the $\underline{d2}$ vector must accordingly be doubled whereby $\underline{d2}=2\underline{d2}$. The $d2^2$ value can then be obtained by the same methods used in the calculation of $d1^2$. The $d2^2$ value is next clamped to the appropriate range and, in step 18, its 8 highest order bits are then assigned to the specular light coefficient, Cs, in a like manner to the aforementioned Cd value.

By methods of the present invention, specular and diffuse light coefficients have now been arrived at for the current pixel. It should be noted that the Cd and Cs values represent darkness intensity values. This is to say that a minimum coefficient value (of zero) represents a maximum illumination by the appropriate (diffuse or specular) light, whereas a maximum coefficient value (255) represents nominal illumination (maximum darkness). For the determination of the pixel color value, it may be desirable to negate the Cd and Cs values—which is accomplished by simply complementing their bit values. The exact color value (as influenced by texture color and light intensity) of the current pixel can then be calculated by blending algorithms not within the scope of the present invention. Athougth the square of the linear distance between two angle proportional vectors (the angle distance) is a close approximation of the cosine intensity reduction of physical light, it may be desirable to specify a custom light intensity variation scheme. This is especially usefull for specular light sources which often possess intensity variation characteristics unique to the light source and the surface composition. In order to provide less rigid intensity variation schemes, a further level of indirection can be introduced. The high order bits (8 or more if higher accuracy is desired) of the light coefficient value, C (Cd and/or Cs as previously detailed), can be used to address a lookup table. The value retrieved from the lookup table can then serve as the final light coeffecient value. The lookup table can alternatly contain light color values (in any valid storage/compression scheme) which are directly addressable from the C value. The use of a color lookup table in this manner allows for the possibiliey of light sources which change color and also saves light color shading calculations since the color of the light is found directly from the C value. This scheme, however, incurrs higher memory usage (to hold the lookup table) and some potential loss of accuracy.

The operations of the second aspect of the present invention may also be used in conjucntion with an "environment map". An environment map can be thought of as a two dimensional map of color values which represent a view of the outside enviroment. Instead of calculating a function of the distance between the angle proportional composite surface orientation vector, $\underline{c}$, and a light source vector for the current pixel, the x and y coordinates of the $\underline{c}$ vector can be used to directly access a two dimensional map which provides information about that light at that point. The map can provide one or more discreet values which can be used as light color or intensity values—depending on the application. The use of the present invention in conjunction with an environment map can provide support for the per pixel light color calculation from irregularly shaped (non-circular) or non-uniform light sources. For most uses of enviroment mapping, all polygons are given the same polygon coordinate system (usually coinciding with the angle at wich the scene is being viewed). Traditionally, environment maps are not addressed with angle proportional vectors. The result is that polygons facing away from the viewpoint are provided increasingly inadequate coverage on the enviroment map. Because of this, the use of bump maps within the traditional form of environment mapping would prove highly inaccurate and inconsistent. The environment mapping capability provided for by the methods and operations of the present invention, however, provide for the use of angle proportional vertex angle vectors. The use of angle proportional two dimensional surface angle vectors in conduction with an enviroment map as detailed above allows for greater environment map coverage as well as the accurate and consistent inclusion of bump mapping.

IMPLEMENTATIONS AND ENHANCEMENTS OF THE METHODS AND OPERATIONS OF THE PRESENT INVENTION

It should be noted that, in implementation, it may not be necessary to make such a rigid distinction between diffuse light vectors and specular light vectors. In a hardware or software implementation of methods and strategies of the present invention, additional light vector characteristics can be user specified by a series of "flags"—usually a sequence of bits wherein for each bit, a particular value (0 or 1) represents the presence or absence of a particular option. For example, a specularity bit flag can be set (1) if the light source is to be treated as a specular light source, and unset (0) if the light source is to be treated as a diffuse light source. Also, a half-size flag can be set if the desired highlight is to be half-size, as previously mentioned in regards to the specularity vector. The half-size flag would cause the implementation to double the distance ($\underline{d}$) vector is the same manner as described above for the specularity distance vector ($\underline{d2}$). In addition, a quarter size flag can be implemented to allow for the desired highlight to be one fourth as large. In this case the distance ($\underline{d}$) vector would simply be scaled by 4. Likewise, eighth and sixteenth size flags can be provided for. Allowing for the user specification of light source characteristics provides for a great deal of flexibility in a system implementing methods and operations of the present invention. Stringently requiring the system calculate specular and diffuse light coefficients for every light source hampers that implementations generality. Sometimes it may be desireable to just use diffuse light sources only, or possibly only specular light sources. Ideally, an implementation of the present invention should provide support for a number of user defined light sources. The user can change the light source characteristics at any time as the application demands. The methods and operations of the present invention are better suited for such a general implementation. The aforementioned operations of the first and second aspects of the present invention are nearly identical in regards to diffuse and specular light. The main fuction of the first aspect of the present invention is to provide for angle proportional light source and vertex vectors in respect to an arbitrary coordinate system. The distinction between diffuse and specular light vectors (or any other type of vector light source) is irrelevant to the general operations provided for in the first aspect of the present invention. Likewise, the second aspect of the present invention provides for the interpolation of two dimentional vertex angle vectors (relative to an arbitrary coordinate system), the addition of one or more bump map vectors to the interpolated vertex angle vector to form a composite surface vector, and the calculation of a light source coefficient value as a function of the distance between the two dimensional light source vector and the composite surface vector. The above mentioned operation of the second aspect of the present invention is not contingent upon the distinction of the light source as being diffuse or specular (or any other category of vector light source). The distinction of the light source as diffuse or specular (or other) is of importance primarily in respect to how it is blended with various other color values which is not in the scope of this invention. The distinction in the detailed description between diffuse and specular light was made primarily to illustrate the ability of the present invention to accomodate these standard modes of lighting and not to limit its use to only light sources specified under these stringent parameters.

In the most general sense, the methods and operations of the present invention provide a computationally effecient and accurate method of finding (some fuction of) the angle difference between an arbitrarily surface orientation and an external direction vector (usually a diffuse or specular light vector). The light coefficient value arrived at in the second aspect of the present invention represented the angle difference between the polygon surface at the current pixel and the external light source direction. The external direction vector, however, need not explicitly represent a light source. Some materials reflect indirect light better than direct light. In such cases, it may be desirable to determine the reflectivity of a point on a polygon surface by comparing the angle difference between the polygon surface vector and the view direction vector. In respect to the present invention, the three dimensional view direction vector can be treated as a light source vector and converted to a two dimensional angle proportional vector relative to the polygon surface vector in the same manner as the conversion of a light source vector. The coefficient value, C, calculated from using the treating the view direction vector as a light source, can be used as a surface reflection coefficient. The reflection coefficient can then be used to selectively scale other light values by algorithms which are beyond the scope of this document.

The methods and operations of the present invention can be applied to the calculation of point light source coefficient values as well as the parallel light source coefficient values previously described. The chief distinction between parallel light sources and point light sources is that the direction and intensity of a parallel light source is fixed whereas the direction and intensity of a point light source can vary across the drawn surface of polygon. In order to accomodate the calculation of point light sources, only slight additions must be made to the first and second aspects of the present invention.

In regards to the first aspect of the present invention, additions must be made to accomodate for the variation of the light source direction across the drawn surface of the polygon. As previously detailed, the calculation of a parallel light source requires converting the three dimensional light source vector (diffuse and/or specular) into an angle proportional two dimensional vector relative to the polygon coordinate system. For point light sources, a three dimensional light source vector (diffuse and/or specular) must be provided for each vertex of the polygon. This collection of light source vectors ($\underline{L1},\underline{L2},\ldots\underline{Ln}$: where n is the number of vertices comprising the current polygon) represents the direction at which the specified light source strikes each vertex of the current polygon. The L1–Ln vectors are assumed to be precalculated and provided prior to the operation of the first part of the present invention. The L1–Ln vectors are then converted into two dimensional angle proportional vectors (l1–ln) relative to the polygon coordinate system by the previously detailed procedure.

Several additions must be also be made to the second aspect of the present invention to accomodate the calculation of point light source coefficient values. As described above, the light source (diffuse and/or specular) is not represented as a collection of two dimensional vectors, l1–ln, each of which corresponds to a vertex of the current polygon. The two dimensional light source vectors (l1–ln) are interpolated across the drawn surface of the polygon in the same manner as the interpolation of the vertex angle vectors. As detailed previously, the interpolation of the vertex angle vectors yields, for each drawn pixel, the surface angle vector, n, which is representative of the polygon surface orientation at the current pixel. Likewise, the interpolation of the light source vectors yields, at each drawn pixel, the light direction vector, l, which is representative of the light source direction at the current pixel. A function of the distance between the composite surface angle vector, c, and the above mentioned light direction vector, l, can then be used to obtain the light source coefficient value by the previously detailed methods. The only addition to the previously defined operation of the second aspect of the present invention is that the light source vector(s) are interpolated from given vertex values in the same manner as the surface angle vector. Since interpolations are linear operations, they can be combined. To avoid performing two interpolations, prior to the operation of the second aspect of the present invention, each vertex light source vector can be subtracted from the surface angle vector for that corresponding vertex resulting in a relative surface angle vector at each vertex (the surface angle relative to the light source direction). The relative surface angle vectors for each vertex can then be interpolated, for each drawn pixel, resulting in a relative surface angle vector, r, for the current pixel. Since the r vector is defined as relative to the light source direction (meaning that the light source is always at the center of the coordinate system) a function of the length of the r vector (since vectors originate at the center of their coordinate system) can then be used to determine the light source coefficient value. While the use of the r vector eliminates the need for two seperate interpolations of surface angle and light vectors, it is subject to the restriction that it can be used with only one light vector as each r value represents the surface angle with respect to only a single light source. For cases where there are more than one light source present, it is generally desireable to interpolate the surface angle vectors and light direction vectors seperately as previously described.

DESCRIPTION OF A PREFERRED HARDWARE EMBODIMENT

The following description and accompanying diagram detail a preferred hardware implementation of the methods and operations of the present invention. As those of ordinary skill in the art will recognize, the present invention could be implemented in other hardware configurations than those described herein. In addition, modifications may be made to the hardware description presented herewith without departing from the scope of the present invention as defined by the appended claims and their equivalents.

Figure 9:
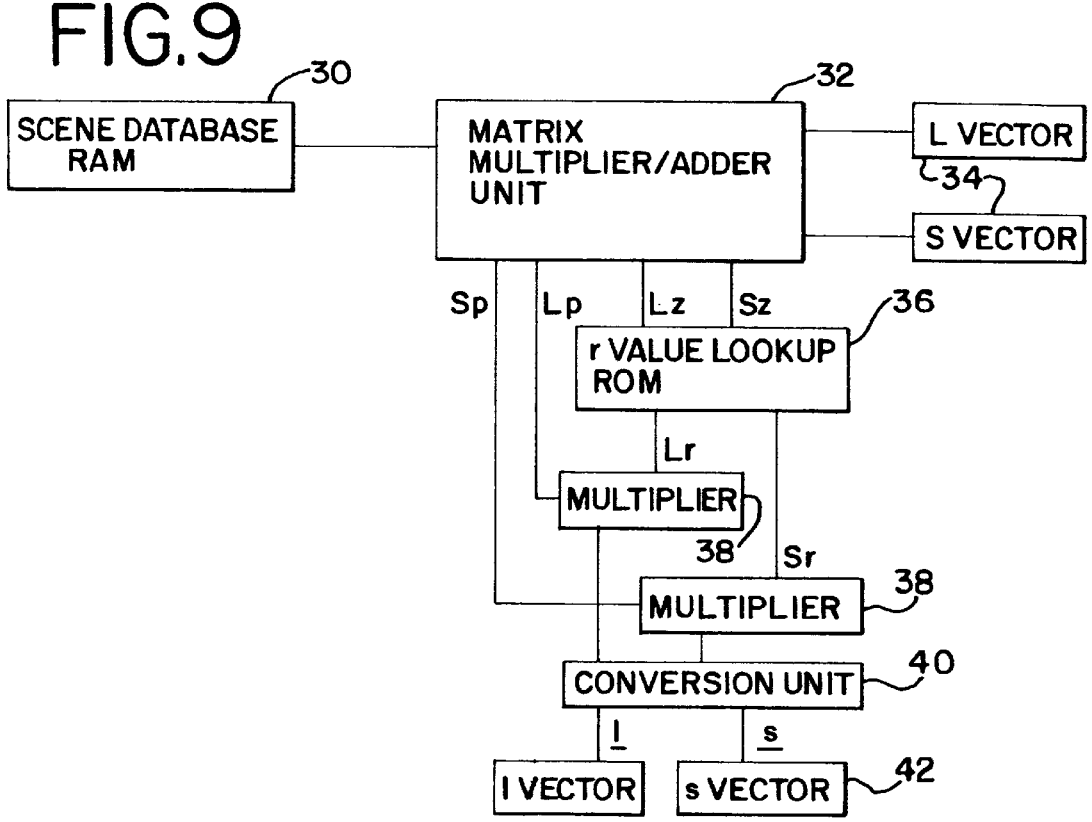
FIG. 9 is a diagram illustrating an embodiment of a graphic display apparatus implementing the first aspect of the present invention.

FIG. 9 illustrates a preferred embodiment of a hardware implementation of the methods and processes comprising part I of the present invention. The aforementioned processes of part I are performed for each polygon within the scene database that requires its surface to be shaded. It should be noted that since the steps comprising part I need only be performed on (at most) a per-polygon basis, the need for a strict hardware implementation of part I is less critical that for that of part II due to the fact that the operations of part I are performed comparatively infrequently (once for each polygon) to those of part II (once for each pixel in each polygon). Thusly, the methods and operations of part I may be employed, at least in part, within computer software as opposed to the strict hardware implementation described herein without incurring a significant loss in overall system performance or efficiency.

The 3×3 matrix representing the face orientation of the current polygon is loaded from scene database memory to a matrix multiplication/addition unit 30. L and S vectors corresponding to the light source potentially affecting the current polygon, assumed to be present and previously arrived at prior to performing any of the operations of part I, are input to the matrix multiplication/addition unit 32. The L and S vectors 34 are best represented as three dimensional floating point vector values. Since a 32-bit floating point value is sufficient for the representation of a vector component, the L and S vectors are adequately stored as 96-bit values. The matrix multiplication/addition unit multiplies the L and S vectors by the current polygon orientation matrix, producing the rotated Lp and Sp vectors which are output as 96-bit, three dimensional floating point vectors. A number of bits from the z-coordinates of the Lp and Sp vectors (Lpz and Spz) are used to index a ROM lookup table 36 which produces the appropriate proportionality (r value) constants (Lr and Sr) for the L and S vectors. The x and y components of the Lp and Sp vectors are then sent to multipliers where they are scaled by the Lr and Sr proportionality values 38. The scaled Lp and Sp vectors are next converted from floating point notation into a fixed point representation such as two's complement or excess notation 40. The conversion unit outputs the two dimensional l and s vectors. The conversion unit may also, optionally, complement the components of the l and s vectors. This is advantageous because the l and s vectors will later be used in subtraction operations. Negating the components beforehand eliminates the need to do so each time a subtraction is required. The l and s vectors are then stored in local memory areas (registers) for their later use in part II of the present invention 42.

Figure 10:
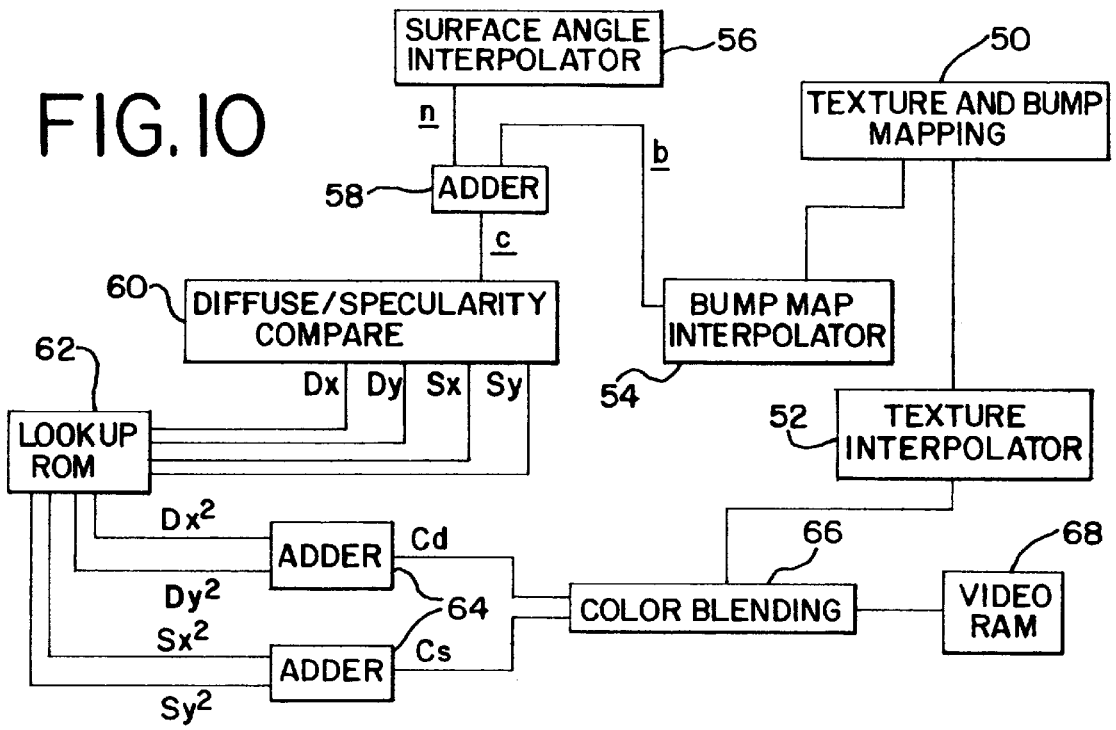
FIG. 10 is a diagram illustrating an embodiment of a graphic display apparatus implementing the second aspect of the present invention.

FIG. 10 illustrates a preferred embodiment of a hardware implementation of the methods and processes of part II of the present invention. The operations of part II are best suited for a direct hardware implementation since they comprise the most time-critical portion of the present invention due to the fact that the above mentioned operations must be performed on a per-pixel basis in a display which can typically consist of well over one million pixels. The methods and operations of part I of the present invention are assumed to have been performed for the current polygon in either computer software or in custom computer hardware prior to the execution of the following hardware implementation.

Texture and bump map values corresponding to the current pixel are fetched from texture memory 50. If color/bump map interpolation (bi-linear or tri-linear filtering) is required, the color and bump map values obtained from texture memory are next interpolated 52. The texture interpolation outputs the sc vector representing the original surface color of the current pixel. The sc vector is most adequately represented with three 8-bit values representing the red, green, and blue color components, making the sc vector 24 bits in length. The bump map interpolator outputs the bump map vector b 54. The b vector consists of two n-bit components representing the net horizontal and vertical angular offset values of the current pixel. In order to provide for sufficient accuracy, 11-bit component values will be used, making the b vector 22 bits in length. At 56, the polygon surface angle vectors at each of the polygon's vertices are interpolated, outputting the surface angle vector n. The n vector consists of two n-bit values representing the horizontal and vertical angular orientation of the current pixel. As with the b vector, 11-bit values will be used to represent the n vector components, making the n vector 22 bits in length.

Using the adder 58, the composite surface vector c is formed by combining the n and b vectors. The 11-bit components of n and b are added to produce the 12-bit components of c. The c vector (24-bits) is then output to the compare logic block 60. At the compare block 60, the x and y components of the c vector ate subtracted from the corresponding components of the angle proportional v and l vectors, assumed to be present and available due to the methods of part I of the present invention. The D and S vectors are formed by the compare block in the following manner:

$$D = c - l \quad (7)$$

$$S = c - s \quad (8)$$

The compare block outputs the x and y components of the D and S vectors. Each component (Dx, Dy, Sx, Sy) is arrived at by the subtraction of the corresponding components of the c vector and the l and s vectors (for example the Sx component is formed by subtracting the x component of the s vector from the x component of the c vector). Since subtraction operations require the second operand to be complemented, it would be advantageous to complement the components of the s and l vectors beforehand and store them in that representation. The output components of the compare block can be represented by 12-bit values (with the carry-out bit ignored).

The D and S vectors output by the compare block must next be squared. The 12-bit component values (Dx, Sy, Sx, Sy) are used to index a ROM lookup table 62 which produces the 10 highest order bits of the square of its index's absolute value. The squares of the D and S component values are then added together to produce the diffuse coefficient value (Cd) and the specular coefficient value (Cs) 64.

The highest order 8 bits of the Cd and Cs values are then sent to the color blending module 66. The color blending module mixes the light source color with the surface color (given by the sc vector) in a manner dictated by the Cd and Cs values. The actual implementation of the color blending is outside the scope of this document. The blender module outputs the resultant 24-bit color vector to video RAM 68.

The methods and descriptions presented here are done so for the purposes of illustration and it is the intention of this disclosure to include equivalent variations of the techniques and methods presented herein. Accordingly, modifications may be made to the methods described above without departing from the scope of the present invention as defined by the appended claims and their equivalents.

I claim:

1. A method for lighting surfaces in a rendering system comprising the steps of:
    providing a scene database including a polygon having a polygon surface represented by three-dimensional vectors;
    providing a light source defining a three-dimensional light source direction vector;
    providing a reference value map with reference values and a bump map with bump map values, the bump map values stored substantially as one or two dimensional vectors only;
    calculating, using dedicated pixel shading computer hardware, a lighting equation to provide a shading value for substantially each drawn pixel residing on the polygon surface using the reference value map and the bump map, the dedicated computer hardware configured to produce a shading value using linear calculations and only mathematical functions selected from the group of addition, subtraction, multiplication and division whereby a display signal incorporating the shading values is generated without using a square root calculation.

2. The method of claim 1 wherein the step of calculating a lighting equation includes interpolating one or more vectors.

3. The method of claim 2 wherein the step of interpolating includes interpolating a surface normal vector.

4. The method of claim 3 wherein the step of calculating a lighting equation includes the use of a reference map which includes information useful in the determination of a shading value.

5. The method of claim 4 wherein the step of calculating a lighting equation includes calculating a surface normal vector per pixel.

6. The method of claim 5 wherein the surface normal vector is calculated using the bump map.

7. The method of claim 6 wherein the bump map is contained at least partially in local texture memory.

8. The method of claim 7 wherein a bump map vector is calculated for substantially each pixel.

9. The method of claim 8 wherein the bump map vector is combined with the surface normal vector.

10. A system for lighting surfaces in a rendering system comprising:
    a scene database including polygon information corresponding to a polygon with the polygon surface represented by three-dimensional vectors and a light source information corresponding to a light source including a three-dimensional light source direction vector;
    a reference value map with reference values and a bump map with bump map values, the bump map values stored substantially as one or two dimensional vectors only;
    a graphics processing unit having dedicated pixel shading computer hardware to calculate a lighting equation to provide a shading value for substantially each drawn pixel residing on the polygon surface using the reference value map and the bump map, the dedicated computer hardware configured to produce a shading value using linear calculations and only mathematical functions selected from the group of addition, subtraction, multiplication and division whereby a display signal incorporating the shading values is generated without using a square root calculation.

11. The system of claim 10 wherein the processing unit includes hardware logic that interpolates one or more vectors.

12. The system of claim 11 wherein the processing unit includes hardware logic that interpolates a surface normal vector.

13. The system of claim 12 wherein the processing unit includes hardware logic operable to receive information from the reference map for use in determination of a shading value.

14. The system of claim 13 wherein the processing unit includes hardware logic operable to calculate a surface normal vector per pixel.

15. The system of claim 14 wherein the processing unit includes hardware logic operable to receive information from the bump map to calculate the surface normal vector.

16. The system of claim 15 wherein the bump map is contained at least partially in a local texture memory.

17. The system of claim 16 wherein the processing unit includes hardware logic operable to calculate a bump map vector for substantially each pixel.

18. The system of claim 17 wherein the process includes hardware logic operable to combine the bump map vector with the surface normal vector.

19. A method for lighting surfaces in a rendering system comprising the steps of:
providing a scene database having information corresponding to a polygon having a polygon surface represented by three-dimensional vectors and information corresponding to a light source including a three-dimensional light source direction vector;
providing a reference value map with reference values and a bump map with bump map values, the bump map values stored substantially as one or two dimensional vectors only;
using a graphics processing unit using dedicated pixel shading computer hardware to calculate a lighting equation to provide a shading value for substantially each drawn pixel residing on the polygon surface using the reference value map and the bump map, the dedicated computer hardware calculating a vertex angle vector and the dedicated computer hardware combining the vertex angle vector with a bump map value to produce a composite surface angle vector and using the composite surface angle vector to produce one or more shading values, and the dedicated computer hardware configured to generally use only linear calculations and mathematical functions selected from the group of addition, subtraction, multiplication and division whereby a display signal incorporating said shading value is generated without using a square root calculation.

20. The method of claim 19 wherein the dedicated computer hardware includes an interpolater that interpolates one or more vectors.

21. The method of claim 20 wherein a surface normal vector is interpolated by the interpolater.

22. The method of claim 21 further comprising a reference map which includes information provided to graphic processing unit.

23. The method of claim 22 wherein the dedicated computer hardware calculates a surface normal vector per pixel.

24. The method of claim 23 wherein the dedicated computer hardware calculates a surface normal vector using the bump map.

25. The method of claim 24 further providing a local texture memory containing the bump map.

26. The method of claim 25 wherein the dedicated computer hardware calculates a bump map vector for substantially each drawn pixel.

27. The method of claim 17 wherein the dedicated computer hardware is operable to combine the bump map vector with the surface normal vector.

28. A system for lighting surfaces in a rendering system comprising:
a scene database having information corresponding to a polygon having a polygon surface represented by three-dimensional vectors and information corresponding to a light source including a three-dimensional light source direction vector;
providing a reference value map with reference values and a bump map with bump map values, the bump map values stored substantially as one or two dimensional vectors only;
a graphics processing unit using dedicated pixel shading computer hardware to calculate a lighting equation to provide a shading value for substantially each drawn pixel residing on the polygon surface using the reference value map and the bump map, the dedicated computer hardware calculating a vertex angle vector and the dedicated computer hardware combining the vertex angle vector with a bump map value to produce a composite surface angle vector and using the composite surface angle vector to produce one or more shading values, and the dedicated computer hardware configured to generally use only linear calculations and mathematical functions selected from the group of addition, subtraction, multiplication and division whereby a display signal incorporating said shading value is generated without using a square root calculation.

29. The system of claim 28 wherein the dedicated computer hardware includes a interpolator operable to interpolate one or more vectors.

30. The system of claim 29 wherein the interpolator is operable to interpolate a surface normal vector.

31. The system of claim 30 further comprising a reference map which includes information useful in the determination of a shading value.

32. The system of claim 31 wherein the dedicated computer hardware is operable to calculate a surface normal vector per pixel.

33. The system of claim 32 wherein the dedicated computer hardware is operable to calculate a surface normal vector using the bump map.

34. The system of claim 33 further comprising a local texture memory containing the bump map.

35. The system of claim 34 wherein the dedicated computer hardware is operable to calculate a bump map vector for substantially each drawn pixel.

36. The system of claim 35 wherein the dedicated computer hardware is operable to combine the bump map vector with the surface normal vector.

\* \* \* \* \*